(12) United States Patent
Zhou et al.

(10) Patent No.: US 11,956,184 B2
(45) Date of Patent: Apr. 9, 2024

(54) AUTONOMOUS FALLBACK FOR FULL-DUPLEX BEAM PAIR

(71) Applicant: QUALCOMM Incorporated, San Diego, CA (US)

(72) Inventors: Yan Zhou, San Diego, CA (US); Kiran Venugopal, Raritan, NJ (US); Navid Abedini, Basking Ridge, NJ (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/322,328

(22) Filed: May 17, 2021

(65) Prior Publication Data

US 2021/0385057 A1  Dec. 9, 2021

Related U.S. Application Data

(60) Provisional application No. 63/035,421, filed on Jun. 5, 2020.

(51) Int. Cl.
*H04L 5/14* (2006.01)
*H04B 7/06* (2006.01)
(Continued)

(52) U.S. Cl.
CPC ......... *H04L 5/1461* (2013.01); *H04B 7/0695* (2013.01); *H04B 17/336* (2015.01); *H04W 24/10* (2013.01)

(58) Field of Classification Search
None
See application file for complete search history.

(56) References Cited

U.S. PATENT DOCUMENTS

2018/0083679 A1 * 3/2018 Lim .................. H04B 17/336
2018/0278310 A1 * 9/2018 Lee .................. H04B 7/0632
(Continued)

FOREIGN PATENT DOCUMENTS

WO   WO-2018083624 A1 * 5/2018 ............. G01K 7/02
WO   2019032882 A1   2/2019

OTHER PUBLICATIONS

International Search Report and Written Opinion dated Nov. 26, 2021 from corresponding PCT Application No. PCT/US2021/032994.

(Continued)

*Primary Examiner* — Scott M Sciacca
(74) *Attorney, Agent, or Firm* — Arent Fox LLP/Qualcomm Incorporated

(57) ABSTRACT

The present disclosure provides systems, devices, apparatus and methods, including computer programs encoded on storage media, for an autonomous fallback for a full-duplex beam pair. In a first aspect, a first wireless device may determine an occurrence of a performance trigger for a current beam pair for full-duplex communication at the first wireless device and use a fallback full-duplex beam pair in response to determining the occurrence of the performance trigger. In a second aspect, the first wireless device may receive an indication from a second wireless device of an occurrence of the performance trigger for the current beam pair for full-duplex communication and using the fallback full-duplex beam pair for communication with the second wireless device in response to receiving the indication.

26 Claims, 11 Drawing Sheets

(51) Int. Cl.
    *H04B 17/336*     (2015.01)
    *H04W 24/10*     (2009.01)

(56) References Cited

U.S. PATENT DOCUMENTS

| | | | |
|---|---|---|---|
| 2020/0059281 A1* | 2/2020 | Grant | H04B 7/088 |
| 2020/0099437 A1* | 3/2020 | Harada | H04W 74/0833 |
| 2021/0006321 A1* | 1/2021 | Wang | H04W 16/28 |
| 2022/0038164 A1* | 2/2022 | Wei | H04W 88/14 |

OTHER PUBLICATIONS

Partial International Search Report—PCT/US2021/032994—ISA/EPO—dated Aug. 30, 2021.

* cited by examiner

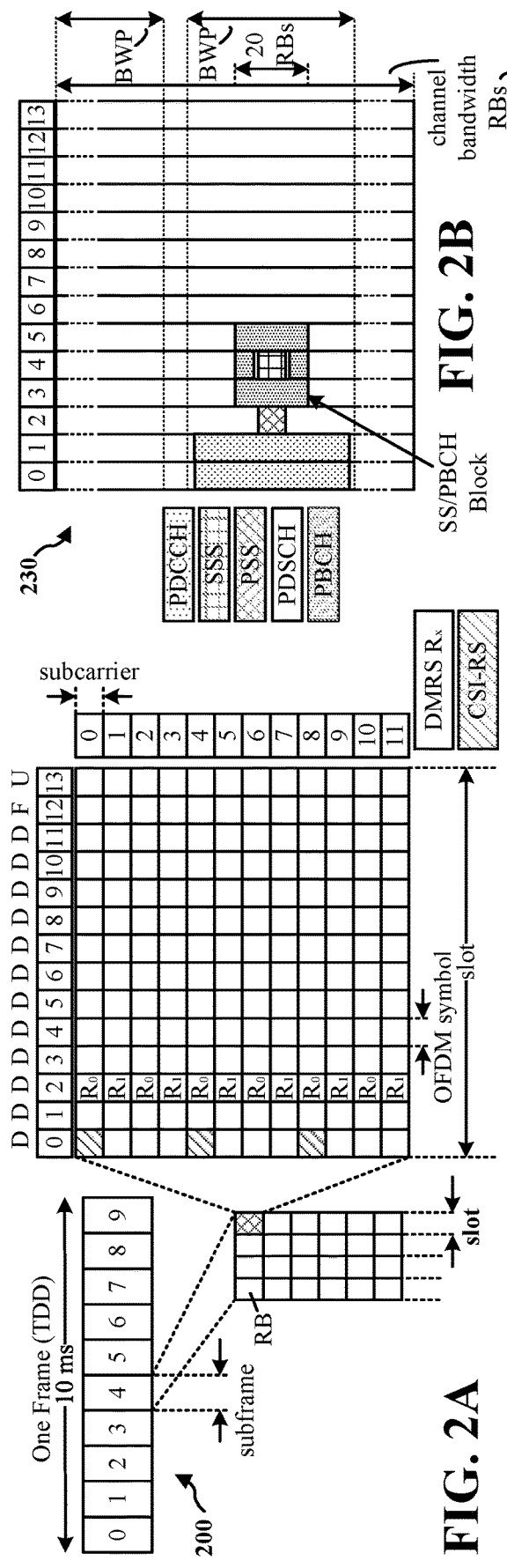
FIG. 2A
FIG. 2B
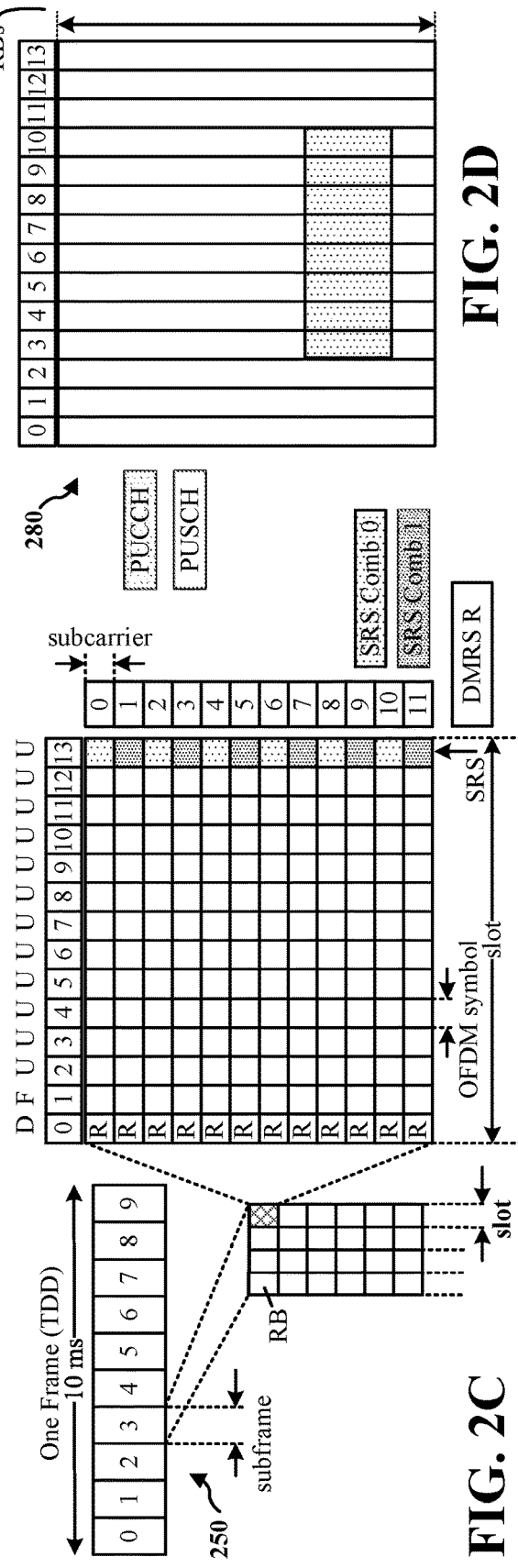
FIG. 2C
FIG. 2D

AUTONOMOUS FALLBACK FOR FULL-DUPLEX BEAM PAIR

CROSS REFERENCE TO RELATED APPLICATION(S)

This application claims the benefit of U.S. Provisional Patent Application Ser. No. 63/035,421, entitled "AUTONOMOUS FALLBACK FOR FULL-DUPLEX BEAM PAIR," filed on Jun. 5, 2020, which is expressly incorporated by reference herein in its entirety.

BACKGROUND

Technical Field

The present disclosure relates generally to communication systems, and more particularly, to an autonomous fallback to back-up a full-duplex (FD) beam pair.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In FD operations, a Downlink (DL)/Uplink (UL) beam pair (e.g., a current FD beam pair) used for communication between a first wireless device and a second wireless device may become degraded or reach a point of failure based on self-interference or other interference within an environment of the wireless devices. Upon degradation of the current FD beam pair below a predetermined quality threshold, one or more of the wireless devices may need a meaningful amount of time to perform self-interference measurements and/or calibration on other beam pairs to determine a new FD beam pair having the threshold quality level that may replace the current FD beam pair. During a period of the measurement and calibration, at least some FD operations may need to be suspended, which may thereby cause increased latency, overhead and interruption to the current communication link between the first wireless device and the second wireless device.

Accordingly, a fallback FD beam pair may be predetermined by the wireless devices as a backup for maintaining FD operations at least during the period of measurement and calibration for the new FD beam pair. The fallback FD beam pair may be determined based on explicit signaling (e.g., using beam identifiers (IDs) or code points) or determined based on an implicit rule, such as a rule for mapping current beam IDs to fallback beam IDs. A switch to the fallback FD beam pair may be triggered proactively or reactively. For proactive triggering, the first wireless device may indicate to the second wireless device the beam IDs corresponding to the degraded beams, so that both wireless devices may replace the current FD beam pair with the fallback FD beam pair based on the fallback beam IDs. For reactive triggering, the fallback FD beam pair may be utilized by the wireless devices after an error has occurred (e.g., when no acknowledgement (ACK) is received in response to a transmission or when a negative acknowledgment (NACK) is received). After switching to the fallback FD beam pair, the wireless devices may utilize the fallback FD beam pair alone (e.g., when the fallback FD beam pair is able to maintain the threshold quality level) or in combination with the degraded/current FD beam pair (e.g., based on a multiplexing technique that may duplicate transmissions over the fallback FD beam pair and the current FD beam pair if the fallback FD beam pair is degraded below the threshold quality level).

In an aspect of the disclosure, a method, a computer-readable medium, and an apparatus are provided. The apparatus may be a wireless device at a UE that includes a memory and at least one processor coupled to the memory. The memory may include instructions that, when executed by the at least one processor, cause the at least one processor to determine an occurrence of a performance trigger for a current beam pair for FD communication at the first wireless device and use a fallback FD beam pair in response to determining the occurrence of the performance trigger.

In another aspect of the disclosure, a method, a computer-readable medium, and an apparatus are provided. The apparatus may be a wireless device at a UE that includes a memory and at least one processor coupled to the memory. The memory may include instructions that, when executed by the at least one processor, cause the at least one processor to receive an indication from a second wireless device of an occurrence of a performance trigger for a current beam pair for FD communication and use a fallback FD beam pair for communication with the second wireless device in response to receiving the indication.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
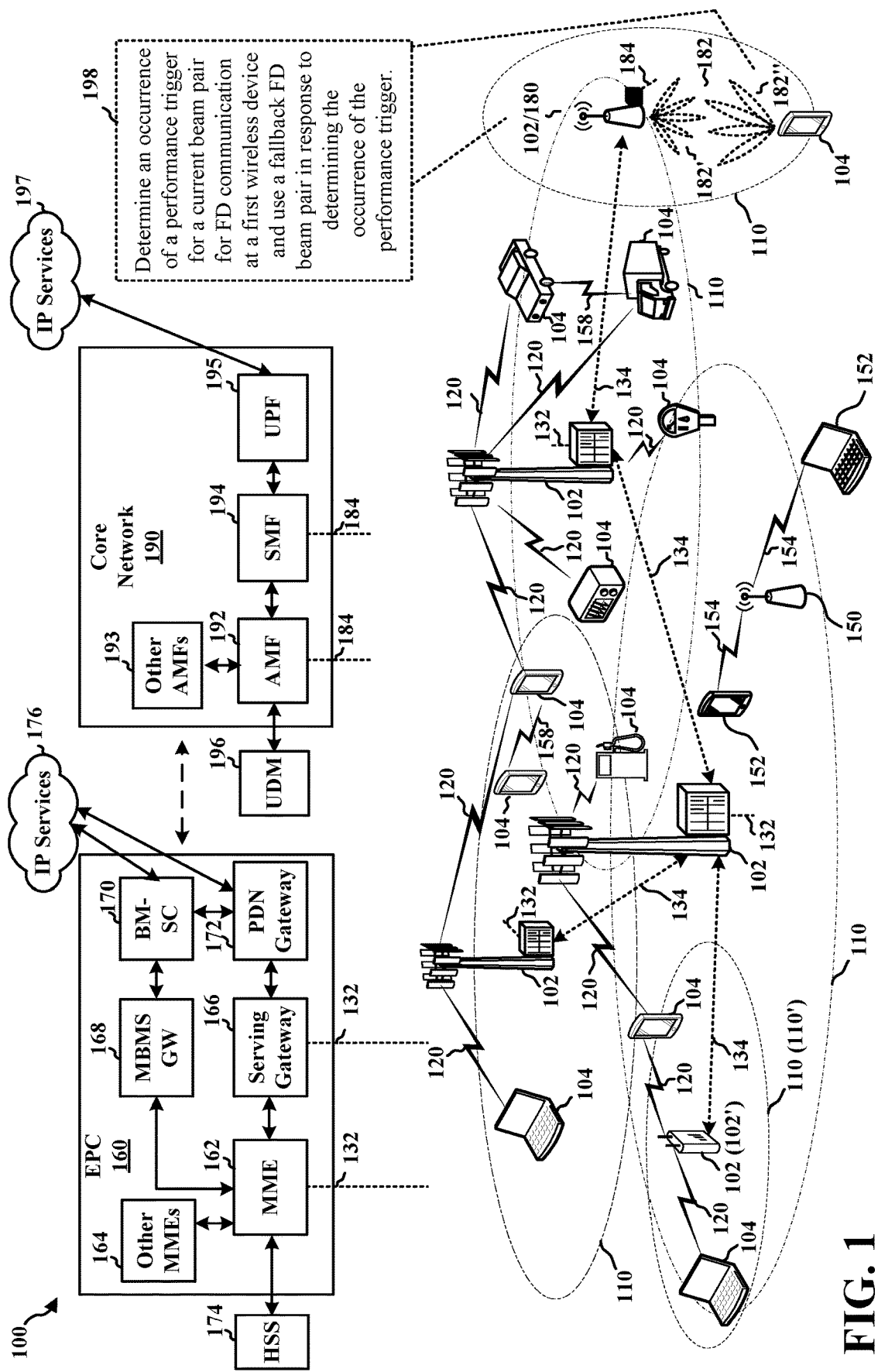
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ES S), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine an occurrence of a performance trigger for a current beam pair for FD communication at a first wireless device and use a fallback FD beam pair in response to determining the occurrence of the performance trigger (198). Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK)/negative acknowledgement (NACK) feedback. The PUSCH carries data, and may additionally be used to carry a buffer status report (BSR), a power headroom report (PHR), and/or UCI.

Figure 3:
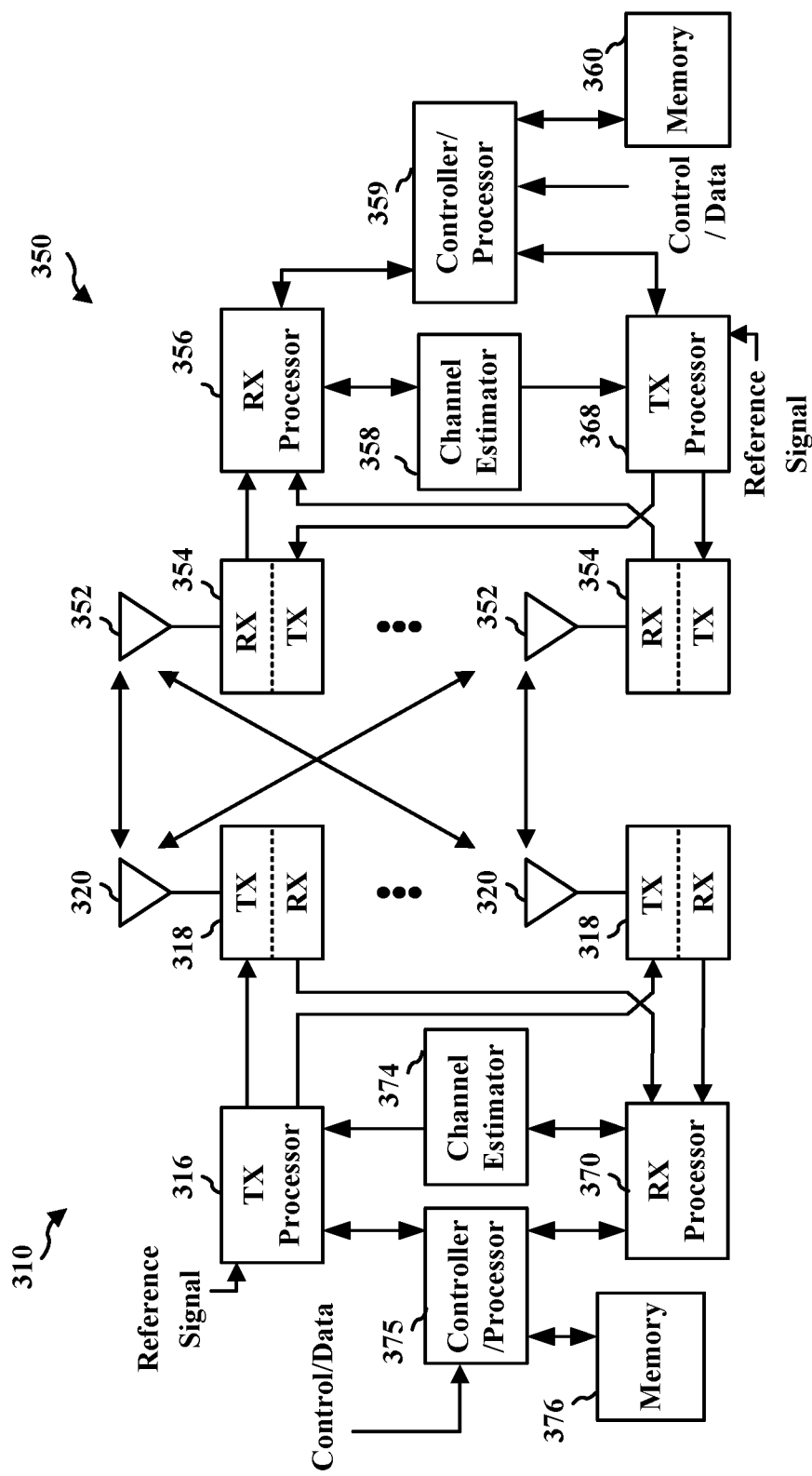
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
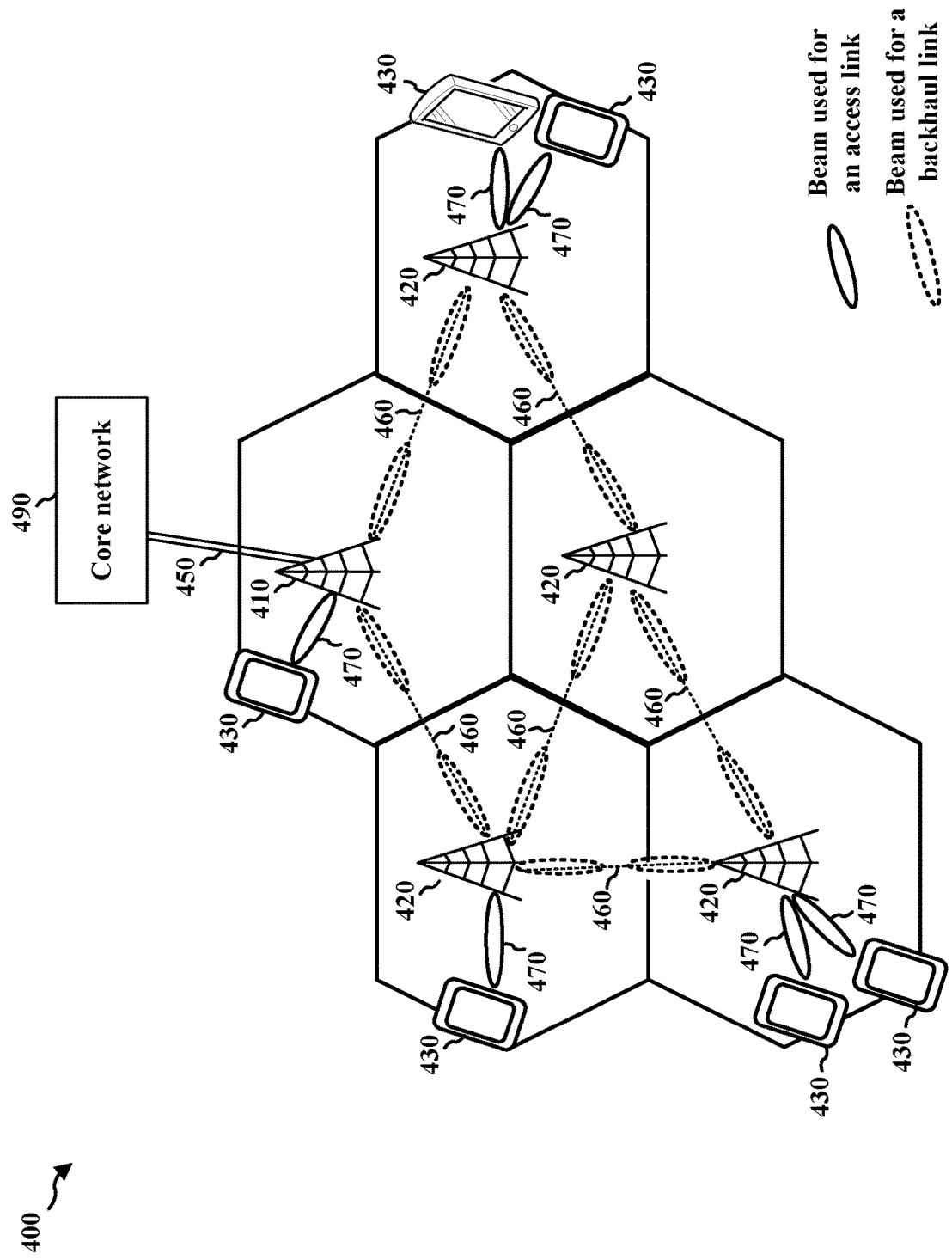
FIG. 4 is a diagram illustrating an example integrated access and backhaul (IAB) network.

FIG. 4 is a diagram illustrating an integrated access and backhaul (IAB) network 400. The IAB network 400 may include an anchor node (that may be referred to herein as an "IAB donor") 410 and access nodes (that may be referred to herein as "IAB nodes") 420. The IAB donor 410 may be a base station, such as a gNB or eNB, and may perform functions to control the IAB network 400. The TAB nodes 420 may comprise L2 relay nodes, etc. Together, the IAB donor 410 and the IAB nodes 420 share resources to provide an access network and a backhaul network to core network 490. For example, resources may be shared between access links and backhaul links in the IAB network.

UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. UEs 430 communicate with the core network by relaying messages through their respective access link 470 to the IAB network 400, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for that IAB donor 410 or IAB node 420. The PCI value may be used to determine a scrambling sequence that is applied to physical signals and/or channels that are transmitted by a particular IAB node. For example, a PSS and/or the SSS transmitted by the respective IAB donor 410 or IAB node 420 may be scrambled using a scrambling sequence that is based on the PCI used by the respective IAB node. A network may have a limited number of available PCI values. For example, 5G NR systems may support 1008 PCI values. Accordingly, a given PCI value may be reused in the same network.

Figure 5:
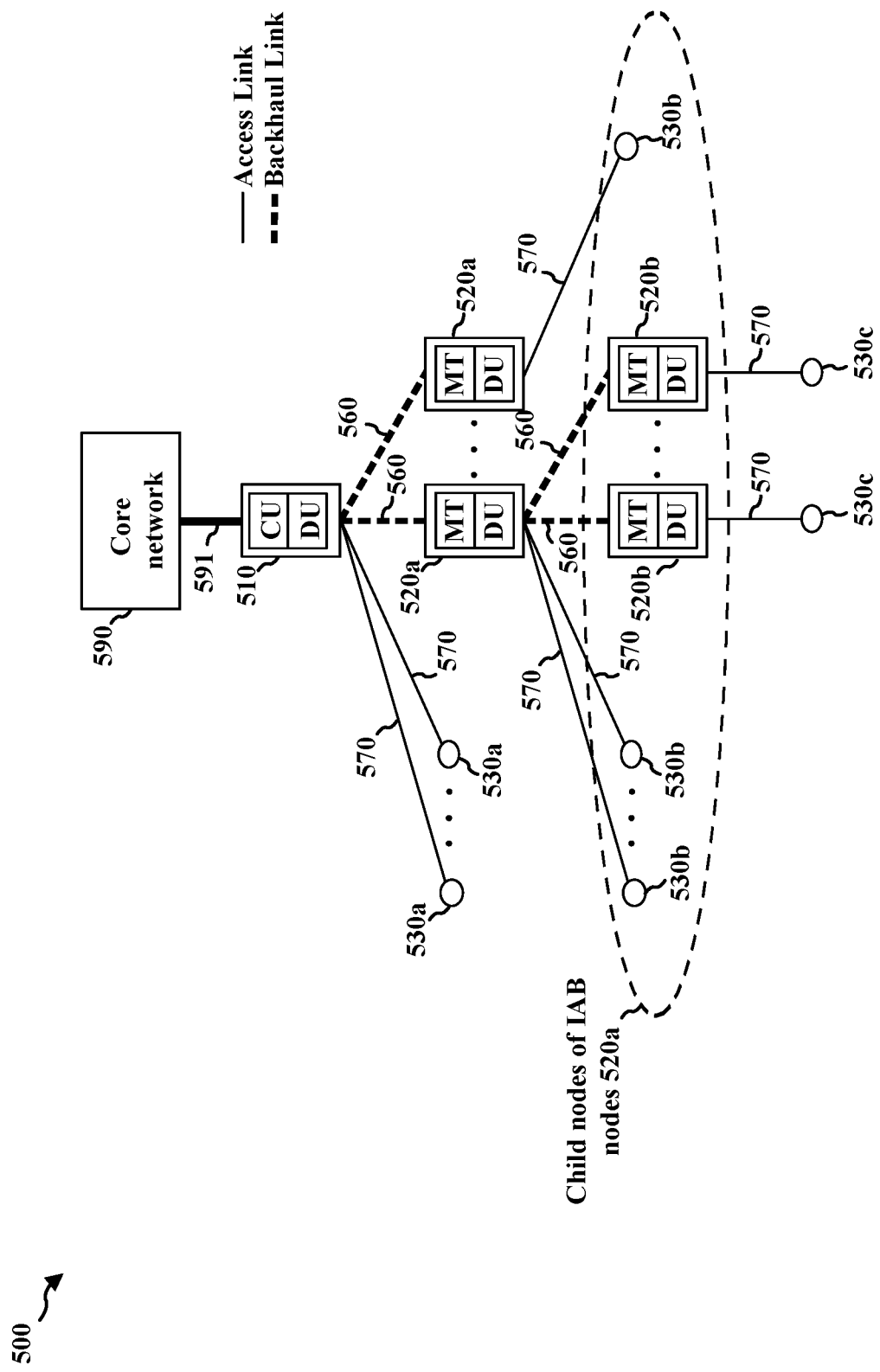
FIG. 5 is a diagram illustrating an example IAB network and components thereof.

FIG. 5 is a diagram illustrating an IAB network 500 and components thereof. The IAB network 500 includes an IAB donor 510 and IAB nodes 520. The IAB nodes, as well as the IAB donor, may provide wireless access links to UEs 530.

The IAB donor 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may be responsible for configuration of the IAB network 500. The CU may perform RRC/PDCP layer functions. The DU may perform scheduling. For example, the DU may schedule resources for communication by the child IAB nodes 520a and/or UEs 530a of the IAB donor 510.

The IAB nodes 520a, 520b may include a mobile termination (MT) and a DU. The MT of IAB node 520a may operate as a scheduled node, scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. As an IAB node may provide a connection to an IAB node that in turn provides a connection for another IAB node. The pattern of a parent IAB node comprising a DU that schedules a child IAB node/child UE may continue to more connections that illustrated in FIG. 5.

A wireless device may transmit and receive communication in a full-duplex (FD) mode in which the device transmits and receives communications using overlapping resources. FD operations may involve simultaneous UL and DL transmissions, for example. Flexible time division duplex (TDD) operations may support FD communication. In wireless communication systems that support FD communication, a wireless device may experience self-interference that degrades the communication. Self-interference may occur if a transmitted signal is leaked to the receive port of the transmitting device. In addition, the transmitted signal may be reflected by an object back to the receive port, which may be known as clutter echo. Reducing self-interference, especially clutter echo, via spatial isolation by properly choosing transmit and receive beams or more advanced transmit/receive beamforming may assist in supporting FD communication.

The flexible TDD capability, including FD capability, may be a capability of a UE, a base station, an IAB node, a parent node, and/or a child node. For example, a UE may be capable of transmitting UL transmissions from one antenna panel while performing DL reception with another antenna panel. In some aspects, the capability may be conditional based on beam separation, the use of different panels, etc.

The flexible TDD capability, and FD mode, may reduce latency for communication by transmitting and receiving at the same time. For example, receiving DL signals in UL slots may enable a UE to receive the DL communication from the base station more quickly and reduce the latency for such communication. The spectrum efficiency may be improved, including improvements per cell and/or per UE. The FD mode may provide more efficient resource utilization.

Self-interference measurements (SIM) may be performed to determine whether FD capability may be supported or not, or may be enabled/enhanced at a wireless device. To perform self-interference measurements, the wireless device may send a signal from a first set of antennas on one or more transmit beam directions, and may measure the received signal (e.g., reflected back or leaked transmission signal) on a second set of antennas on one or more receive beam directions.

In some instances, a wireless device may receive a configuration to perform self-interference measurements from a network entity. The network entity may provide configurations/resources for the wireless device to perform the self-interference measurement. The network entity may configure the wireless device to provide reports of the self-interference measurements. The network entity, based on the received report of self-interference, may determine the wireless device's FD capability, conditions, and/or performance. However, the network entity may not account for clutter echo in configuring the wireless device to perform self-interference measurements.

In some instances, the wireless device may be configured to perform self-interference measurements without specific instructions from a network entity. For example, a network entity (e.g., a distributed unit (DU)) may send a DL signal (e.g., SSB/CSI-RS). The wireless device may measure what level of the DL signal is received, in terms of reference signal received power (RSRP), on its receive port/antennas. In another example, if a UE or a mobile termination (MT) is scheduled to send an UL signal (e.g., SRS), the UE or MT may perform a self-interference measurement on its receive port/antennas. In some instances, the wireless device may not provide any reporting of the self-interference measurements to another entity (e.g., network). The wireless device may use the self-interference measurement to determine whether it may support FD or for beam tuning. However, the wireless device may not account for clutter echo while performing the self-interference measurement.

Figure 6A:
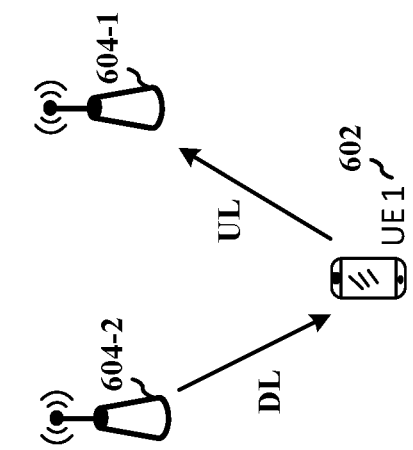
FIGS. 6A-6C are diagrams illustrating examples of FD communication.
Figure 6B:
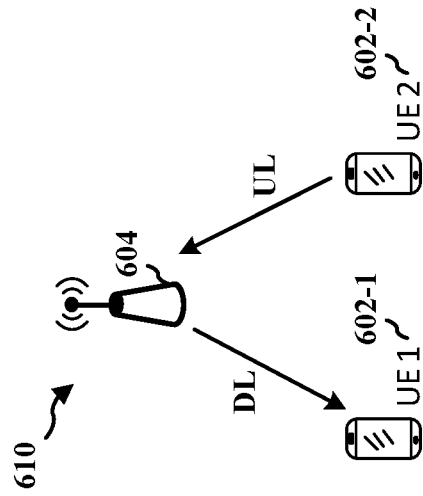
Figure 6C:
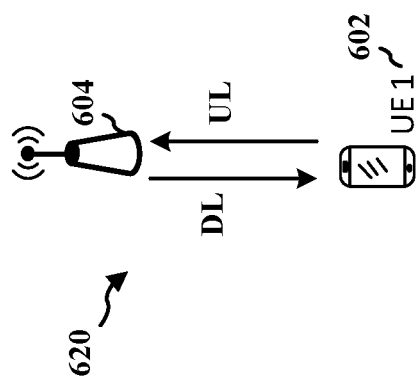

FIGS. 6A-6C are diagrams illustrating examples 600, 610, 620 of FD communication. The example 600 of FIG. 6A includes a UE1 602 and two base station (e.g., TRPs) 604-1, 604-2, wherein the UE1 602 is sending UL transmissions to base station 604-1 and is receiving DL transmissions from base station 604-2, e.g., in a simultaneous manner that overlaps in time. In the example 600 of FIG. 6A, FD is enabled for the UE1 602, but not for the base stations 604-1, 604-2. The example 610 of FIG. 6B includes two UEs, UE1 602-1 and UE2 602-2 and a base station 604, wherein the UE1 602-1 is receiving a DL transmission from the base station 604 and the UE2 602-2 is transmitting an UL transmission to the base station 604, e.g., in a simultaneous manner that overlaps in time. In the example 610 of FIG. 6B, FD is enabled for the base station 604, but not for the UEs UE1 602-1 and UE2 602-2. The example 620 of FIG. 6C includes a UE1 602 and a base station 604, wherein the UE1 602 is receiving a DL transmission from the base station 604 and the UE1 602 is transmitting an UL transmission to the same base station 604, e.g., in a simultaneous manner that overlaps in time. In the example 620 of FIG. 6C, FD is enabled for both the UE1 602 and the base station 604.

The present disclosure relates to improving the manner in which self-interference measurement may be configured. A self-interference measurement configuration may be adjusted in response to detected clutter echo. For example, a wireless device may be configured to detect clutter echo and may report such results to a network entity, such that the network entity may adjust the self-interference configuration. In another example, a wireless device may be configured to detect clutter echo and may request a self-interference measurement configuration in view of the detected clutter echo. Configuring the self-interference measurement to account for detected clutter echo may assist in performing self-interference measurements. As such, improving the manner in which a self-interference measurement is configured to allow for the detection of clutter echo is desirable.

Beam separation of the transmit and receive beams assist in limiting or reducing self-interference that may occur during FD communication. It is desirable to account for clutter echo when configuring self-interference measurements to minimize self-interference. Determining whether clutter echo is present may allow for the self-interference measurement configuration to be adjusted, which may provide a reliable FD communication by selecting beam pairs that minimize or reduce self-interference.

Figure 7:
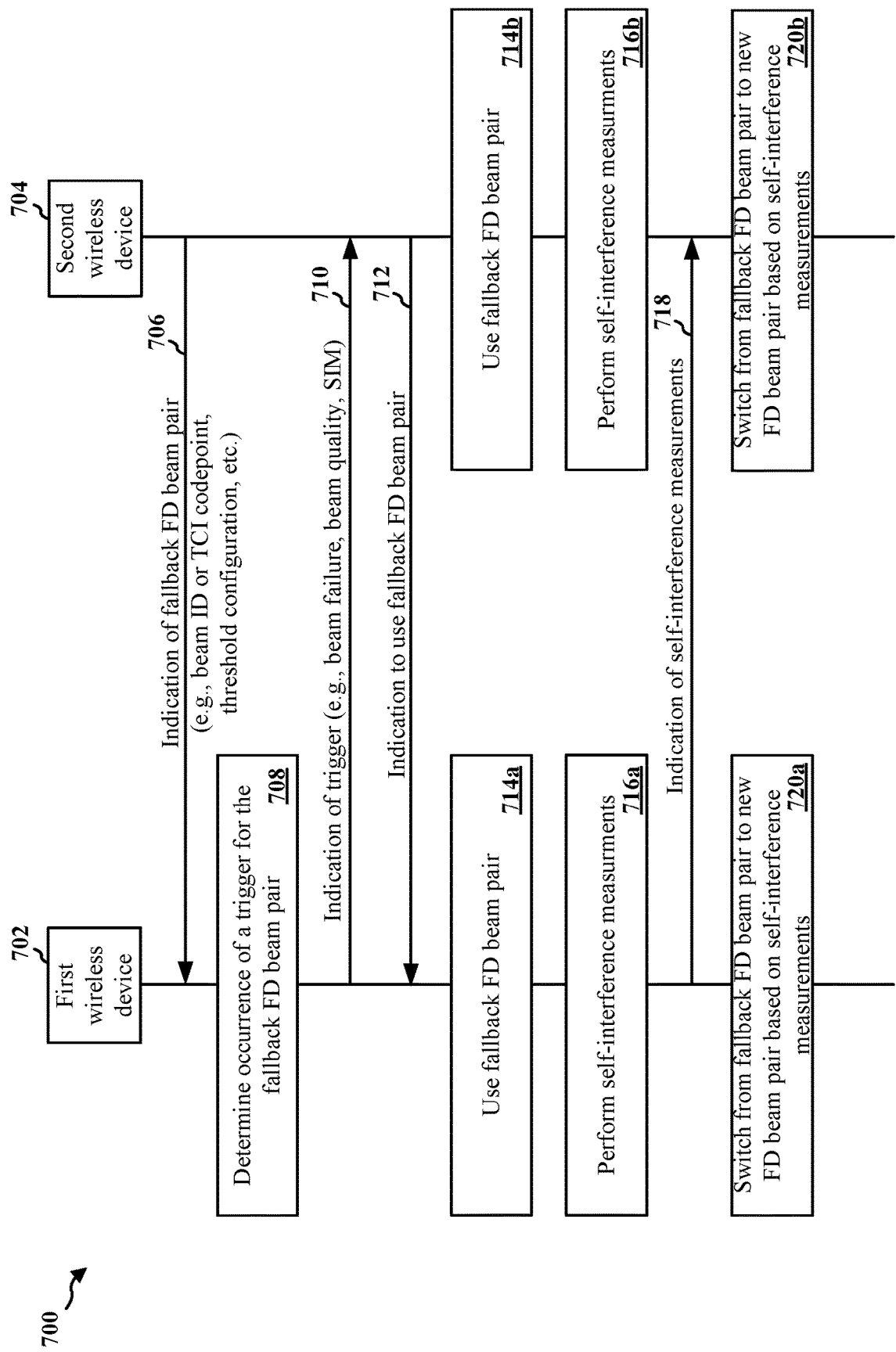
FIG. 7 is a call flow diagram illustrating communications between a first wireless device and a second wireless device in accordance with certain aspects of the disclosure.

FIG. 7 is a call flow diagram 700 illustrating communications between a first wireless device 702 and a second wireless device 704. In some aspects, the first wireless device 702 may be a UE and the second wireless device 704 may be a base station, where the base station provides a cell serving the UE. In other examples, the first wireless device 702 may be a UE and the second wireless device 704 may be an IAB node. In other examples, the first wireless device may be an IAB node (e.g., a child node) and the second wireless device may be a parent IAB node, a donor node, or a base station. For example, in the context of FIG. 1, the second wireless device 704 may correspond to the base station 102/180 or an IAB node and, accordingly, the cell may include a geographic coverage area 110 in which communication coverage is provided and/or small cell 102' having a coverage area 110'. Further, the first wireless device 702 may correspond to a UE 104 or an IAB node. In another example, in the context of FIG. 3, the second wireless device 704 may correspond to the device 310, and the first wireless device 702 may correspond to the device 350.

At 706, the first wireless device 702 may receive an indication of a fallback FD beam pair from the second wireless device 704. The indication may include a beam identifier (ID) (e.g., an UL beam ID, a DL beam ID, or a beam pair ID) of the fallback FD beam pair. Additionally or alternatively, the indication may include a transmission configuration indicator (TCI) codepoint that maps to a TCI state. At 708, the first wireless device 702 may determine that a trigger for the fallback FD beam pair has occurred. The trigger may include a beam failure, a beam quality/performance falling below a threshold level, a self-interference measurement above a threshold amount, etc. Such thresholds may be configured by the second wireless device 704 (e.g., the network) via the indication transmitted, at 706, to the first wireless device 702.

At 710, the first wireless device 702 may provide an indication of the occurrence of the trigger to the second wireless device 704. In response to the indication of the trigger, the second wireless device 704 may indicate, at 712, to the first wireless device 702 to use the fallback FD beam pair (e.g., the fallback FD beam pair previously indicated at 706 to the first wireless device 702). At 714a-b, the first wireless device 702 and the second wireless device 704 may each use the fallback FD beam pair to maintain FD communication.

At 716a-b, the first wireless device 702 and the second wireless device 704 may each perform self-interference measurements to determine a new beam pair for FD communication that may replace the beam pair that provided the occurrence of the trigger. At 718, the first wireless device 702 may provide an indication of the self-interference measurements to the second wireless device 704. Based on the self-interference measurements, the first wireless device 702 and the second wireless device 704 may each switch, at 720a-b, from the fallback FD beam pair to the new beam pair determined from the self-interference measurements for maintaining FD communication between the first wireless device 702 and the second wireless device 704.

In a FD operation, a DL/UL beam pair initially identified by the first wireless device 702 for communicating with the second wireless device 704 may become degraded or reach a point of failure based on self-interference caused by leakage from a transmitter of the first wireless device 702 to a receiver of the first wireless device 702. As such, a secondary DL/UL beam pair (e.g., a fallback FD beam pair) may be predetermined by the wireless devices 702-704 as a backup for maintaining the FD operation in the event that the initial DL/UL beam pair (e.g., a current FD beam pair) degrades below a predefined threshold. In certain aspects, movement/rotation of the first wireless device 702 or moving objects/reflectors in an environment of the first wireless device 702 may cause a quality of the current FD beam pair to degrade below the predefined threshold. Prior to changed conditions of the first wireless device 702 or changed conditions in the associated environment, the current FD beam pair utilized for providing a FD link between the wireless devices 702-704 may be assumed to be of the threshold quality level unless/until degraded conditions are detected by at least one of the wireless devices 702-704.

If the current FD beam pair degrades below the threshold quality level, the first wireless device 702 may need to rely on the fallback FD beam pair for maintaining the threshold level of quality. In instances of degraded FD beam pairs, the first wireless device 702 may need a meaningful amount of time to perform self-interference measurements and calibration on other beam pairs to determine a replacement/new FD beam pair having the threshold level of quality to replace the current FD beam pair. During the measurement and calibration period, at least some FD operations may need to be suspended, which may thereby cause increased overhead and interruption to an existing communication link between the first wireless device 702 and the second wireless device 704. An initial process for determining the beam pair may be based on self-interference measurements indicative of the beams that cause the least amount of self-interference. The first wireless device 702 and the second wireless device 704 (e.g., FD node) may utilize RSs transmitted in both directions to measure a level of self-interference from the transmission on the other beam in the beam pair. The first wireless device 702 may then generate a confirmation that indicates, for example, the top N beams (e.g., 3 beams) that may be used for performing FD communication.

Having a predetermined fallback FD beam pair for the first wireless device 702 may decrease the time period required to switch from the current FD beam pair to a different FD beam pair following a degradation. The first wireless device 702 may utilize the fallback FD beam pair at least during the measurement and calibration period while determining a replacement beam pair for the current FD beam pair. In some examples, the fallback FD beam pair may be the replacement beam pair for the current FD beam pair. The fallback FD beam pair may be explicitly signaled or determined based on an implicit rule. Switching to the fallback FD beam pair may be triggered proactively or reactively based on degradation to the current FD beam pair and, after the switching occurs, the fallback FD beam pair may be used alone or in combination with the current FD beam pair that has degraded. The fallback FD beam pair may be configured so that both the first wireless device 702 and the second wireless device 704 may switch to the fallback FD beam pair if the quality of the current FD beam pair degrades below the threshold quality level. In examples, the threshold quality level may be configurable.

In some configurations, explicit signaling from the second wireless device 704 may be used to indicate the fallback FD beam pair. The first wireless device 702 may be configured to transmit a report to the second wireless device 704 indicative of candidate beam pairs for the fallback FD beam pair and, based on the candidate beam pairs, the second wireless device 704 may signal to the first wireless device 702 one or more IDs for the fallback FD beam pair through DCI, a MAC-control element (MAC-CE), RRC signaling, etc. Each beam in the fallback FD beam pair may be identified by the first wireless device 702 based on the IDs.

For example, a beam ID may indicate UL and DL TCI states to be used for the fallback FD beam pair. A first type of beam ID may indicate separate UL/DL TCI states. A second type of beam ID may indicate a single TCI beam pair, such as a codepoint that maps to both the UL and DL TCI states.

In other configurations, an implicit rule may be used to determine the fallback FD beam pair. For instance, past beam pair measurements performed by the first wireless device 702 may be utilized by both the first wireless device 702 and the second wireless device 704 to determine the fallback FD beam pair to be used in case the current FD beam pair becomes degraded. The fallback FD beam pair may be selected from a subset of the past beam pair measurements. In an example, the first wireless device 702 may determine and report to the second wireless device 704 a top N number of FD beam pairs having the best quality. The determination may be based on a layer 1 (L1) RSRP or a L1 signal-to-interference-plus-noise ratio (SINR) for each DL and UL beam per beam pair.

The implicit rule for determining the fallback FD beam pair may be indicated or defined based on a subset of the reported FD beam pairs. For example, the implicit rule may be that beams in the fallback FD beam pair correspond to a beam X and a beam X+1 in the total number of beam pairs included in the subset of reported FD beam pairs. The value of X, which may point to the fallback FD beam pair, may be determined based on a fixed rule or the value of X may be dynamically signaled by the second wireless device 704. Such techniques may be different from transmitting a beam ID in that the beams X and X+1 that correspond to the fallback FD beam pair may be determined based on a direct measurement of the beams from a preceding reporting instance of the first wireless device 702.

Monitoring the quality of the current FD beam pair may be performed to proactively trigger a switching of the first wireless device 702 and/or the second wireless device 704 to the fallback FD beam pair, if the quality of the current FD beam pair degrades below the predetermined threshold. The quality of the UL and DL beams in the current FD beam pair may be determined/measured with corresponding UL/DL RSs based on L1-RSRP/L1-SINR or estimated based on a block error rate (BLER). The RSs may include CSI-RS, SRS, positioning reference signal (PRS), SSB, etc. Some RSs may be periodically transmitted and monitored in the UL and the DL (e.g., at opposite nodes). That is, UL and DL nodes may be expected to measure the RSs. In the DL, the RS may be a CSI-RS or a SSB. In the UL, the RS may be a SRS. Based on a measurement of the RSs in terms of L1-RSRP/L1-SINR or a mapping to a higher rate at a SINR threshold, the first wireless device 702 may determine that the current FD beam pair has failed or degraded below the predetermined threshold. The first wireless device 702 may then switch to the fallback FD beam pair.

The wireless devices 702-704 may be configured to switch to the fallback FD beam pair if the measured quality of the current FD beam pair degrades below the predetermined threshold. In examples, multiple sets of beam pairs may be monitored at a same time. Further, a subset of the multiple sets of beam pairs may have different quality thresholds. The first wireless device 702 and/or the second wireless device 704 may transmit beam IDs of the current FD beam pair, so that the beam IDs may be replaced with the beam IDs of the fallback FD beam pair. In examples, different beam IDs may be associated with the different quality thresholds. If a first beam ID for the current FD beam pair becomes associated with a failure or threshold level of degradation, the beams of the fallback FD beam pair may be determined based on a TCI state identifier, which may be explicitly signaled or may be determined based on an implicit rule. In cases of multiple beam IDs, an implicit rule for mapping the current beam IDs to the fallback beam IDs may be that a first current beam ID may map to a first fallback beam ID, a second current beam ID may map to a second fallback beam ID, and so forth.

In another aspect, rather than proactively monitoring a quality of the current FD beam pair, the fallback FD beam pair may be reactively triggered if the current FD beam pair is determined to have degraded below the predetermined threshold. While reactively triggering the fallback FD beam pair may provide latency based on a need to communicate over the FD link, the fallback FD beam pair may only need to be determined when errors/degradation occurs with respect to the FD link. For example, if the first wireless device 702 transmits a communication to another node and receives a NACK in response to the communication or does not receive anything in response to the communication (e.g., no ACK), the first wireless device 702 may determine that the current FD beam pair has degraded/failed. In such cases, both nodes may need to switch to the fallback FD beam pair for subsequent communications (e.g., via PDCCH, PDSCH, PUCCH, and/or PUSCH).

While reactive triggering may decrease overhead by eliminating the need to transmit RSs between the nodes on a periodic basis, an actual failure may need to occur before the nodes may switch to the fallback FD beam pair. Once a particular communication has failed (e.g., based on an absence of an ACK by the receiving node) both nodes may need to switch to the fallback FD beam pair for subsequent communications. If a communication is currently being transmitted through a channel over one of the beams in the current FD beam pair and no ACK is received for the channel, the transmitting node may switch to the fallback FD beam pair. Such aspects may be in contrast to proactive triggering, where switching to the fallback FD beam pair may occur prior to the communication being transmitted.

The first wireless device 702 and the second wireless device 704 may communicate based on the fallback FD beam pair alone or the first wireless device 702 and the second wireless device 704 may communicate based on the fallback FD beam pair together with the current FD beam pair that is determined to include the degraded quality. In a first example, after switching to the fallback FD beam pair, the first wireless device 702 and the second wireless device 704 may not attempt to reconnect over the FD link provided via the initial FD beam pair, if the fallback FD beam pair is able to maintain the threshold quality level. Thus, the initial FD beam pair may be replaced (e.g., at least temporarily) by the fallback FD beam pair. In a second example, the fallback FD beam pair may degrade below the threshold quality level subsequent to the initial FD beam pair degrading below the threshold quality level. As a result, multiplexing techniques such as time division multiplexing (TDM), frequency division multiplexing (FDM), or space division multiplexing (SDM) may be utilized to duplicate transmissions over the initial FD beam pair and the fallback FD beam pair to increase reliability.

Figure 8:
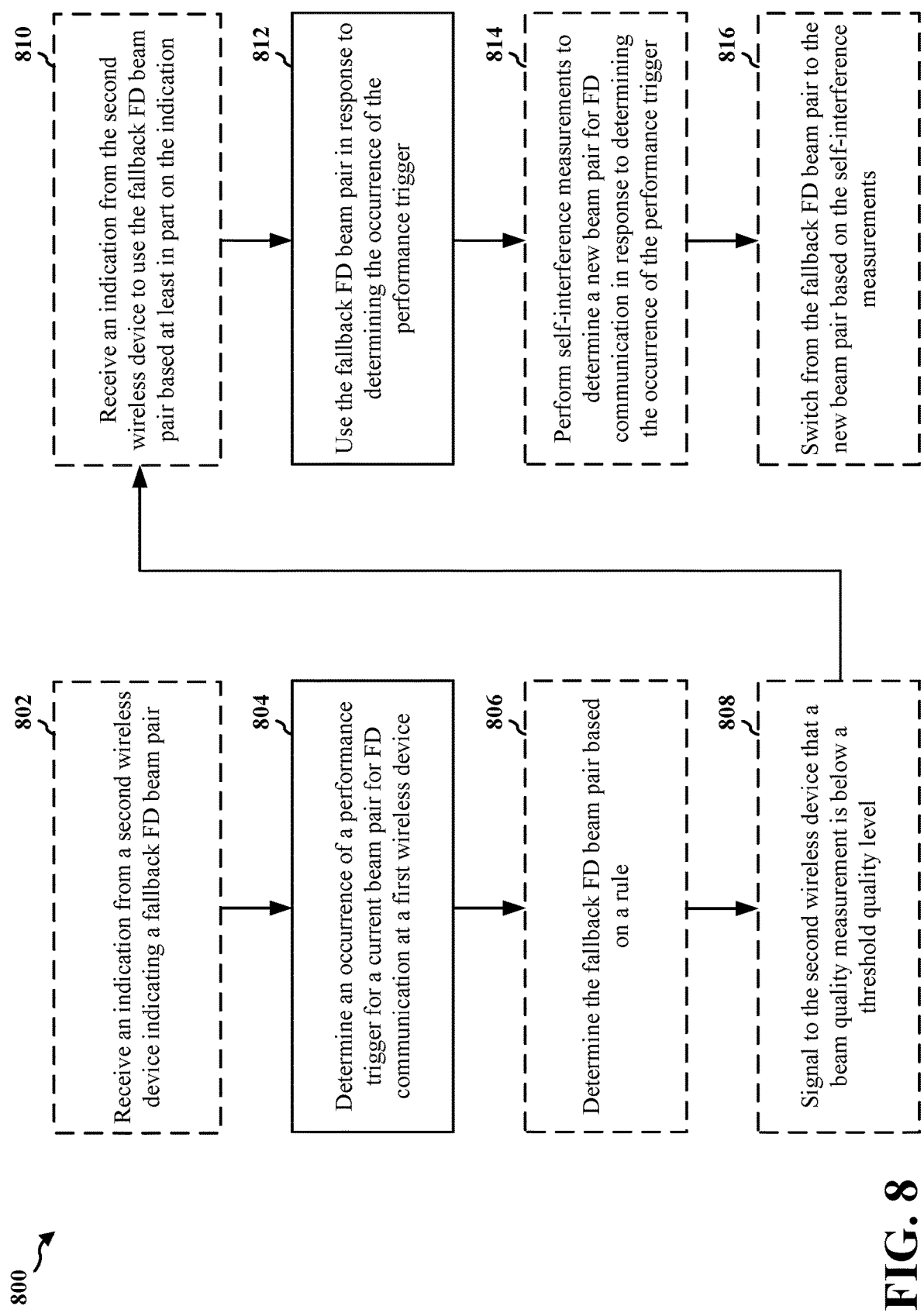
FIG. 8 is a flowchart of a method of wireless communication of a wireless device that determines an occurrence of a trigger for using a fallback FD beam pair.

FIG. 8 is a flowchart 800 of a method of wireless communication of a wireless device (e.g., a first wireless device 702) that determines an occurrence of a trigger for using a fallback FD beam pair. The first wireless device 702 may be an IAB node (e.g., child node) or a UE, which may include the memory 360 and which may be the entire UE or a component of the UE, such as the TX processor 368, the RX processor 356, and/or the controller/processor 359.

At 802, the wireless device may receive an indication from a second wireless device indicating a fallback FD beam pair (e.g., prior to the wireless device determining the occurrence of a performance trigger). For example, referring to FIG. 7, the first wireless device 702 may receive, at 706, an indication of the fallback FD beam pair from the second wireless device 704. The fallback FD beam pair may be indicated (e.g., at 706) by one or more of an UL beam ID for an UL beam of the fallback FD beam pair, a DL beam ID for a DL beam of the fallback FD beam pair, a beam pair ID for the fallback FD beam pair, or a TCI codepoint that maps to an UL and DL TCI state for the fallback FD beam pair. Further, the indication at 706 may be communicated in one or more of DCI, a MAC-CE, or RRC signaling.

At 804, the wireless device may determine an occurrence of a performance trigger for a current beam pair for FD communication at the wireless device. For example, referring to FIG. 7, the first wireless device 702 may determine, at 708, that a trigger has occurred for utilizing the fallback FD beam pair. The performance trigger (e.g., indicated at 710 to the second wireless device 704) may include one or more of a beam failure for at least one beam of the current beam pair, a beam performance below a threshold performance level for the current beam pair, a beam quality measurement below a threshold quality level for the at least one beam of the current beam pair, or a self-interference measurement above a threshold interference level for the current beam pair. The performance trigger (e.g., determined to occur at 708) may be based on a communication error that may occur, for example, based on reception or transmission of a NACK. Additionally or alternatively, the performance trigger (e.g., determined to occur at 708) may be based on a beam quality measurement including at least one of a RSRP for a reference signal, a SINR for the reference signal, or a BLER for the at least one beam of the current beam pair. The reference signal may include at least one or a CSI-RS, a SRS, a PRS, or a SSB.

At 806, the wireless device may determine the fallback FD beam pair based on a rule. For example, referring to FIG. 7, the first wireless device 702 may determine the occurrence of the trigger for the fallback FD beam pair at 708 based on a rule, such as an explicit rule (e.g., a rule that may be defined or received from the second wireless device 704) or an implicit rule (e.g., a rule that may be based on at least one of a subset of reported FD beam pairs from the first wireless device 702 or the current beam pair used by the first wireless device 702 and the second wireless device 704).

At 808, the wireless device may signal to a second wireless device that the beam quality measurement is below a threshold quality level. For example, referring to FIG. 7, the first wireless device 702 may signal, at 710, to the second wireless device 704 that a beam measurement and/or self-interference measurement is below the threshold level. In an example, the first wireless device 702 may be a UE and the second wireless device 704 may be a base station or an IAB node. In another example, the first wireless device 702 may be an IAB node (e.g., child node) and the second wireless device 704 may be a parent IAB node.

At 810, the wireless device may receive an indication from the second wireless device to use the fallback FD beam pair, wherein the first wireless device uses the fallback FD beam pair based at least in part on the indication. For example, referring to FIG. 7, the first wireless device 702 may receive an indication, at 712, from the second wireless device 704 to use the fallback FD beam pair. The fallback FD beam pair may be explicitly indicated at 706 or the fallback FD beam pair may be implicitly indicated based on a rule. In examples, the fallback FD beam pair may be determined based on the current beam pair.

At 812, the wireless device may use the fallback FD beam pair in response to determining the occurrence of the performance trigger. For example, referring to FIG. 7, the first wireless device 702 may use the fallback FD beam pair at 714a after determining, at 708, that a trigger for the fallback FD beam pair has occurred. The first wireless device 702 may use the fallback FD beam pair for one or more of a PDCCH, a PDSCH, a PUSCH, or a PUCCH. In aspects, the first wireless device 702 may use the fallback FD beam pair, at 714a, without continuing to use the current beam pair. In other aspects, the first wireless device 702 may continue to use the current beam pair along with using the fallback FD beam pair, at 714a. For example, the first wireless device 702 may use the current beam pair and the fallback FD beam pair, at 714a, for duplicate communication. Additionally or alternatively, the first wireless device 702 may use a multiplexing scheme for communication on the current beam pair and the fallback FD beam pair.

At 814, the wireless device may perform self-interference measurements to determine a new beam pair for FD communication in response to determining the occurrence of the performance trigger. For example, referring to FIG. 7, the first wireless device 702 may perform the self-interference measurements at 716a after determining, at 708, that a trigger has occurred for utilizing the fallback FD beam pair.

At 816, the wireless device may switch from the fallback FD beam pair to the new beam pair based on the self-interference measurements. For example, referring to FIG. 7, the first wireless device 702 may switch, at 720a, to a new FD beam pair from the fallback FD beam pair based on the self-interference measurements performed at 716a.

Figure 9:
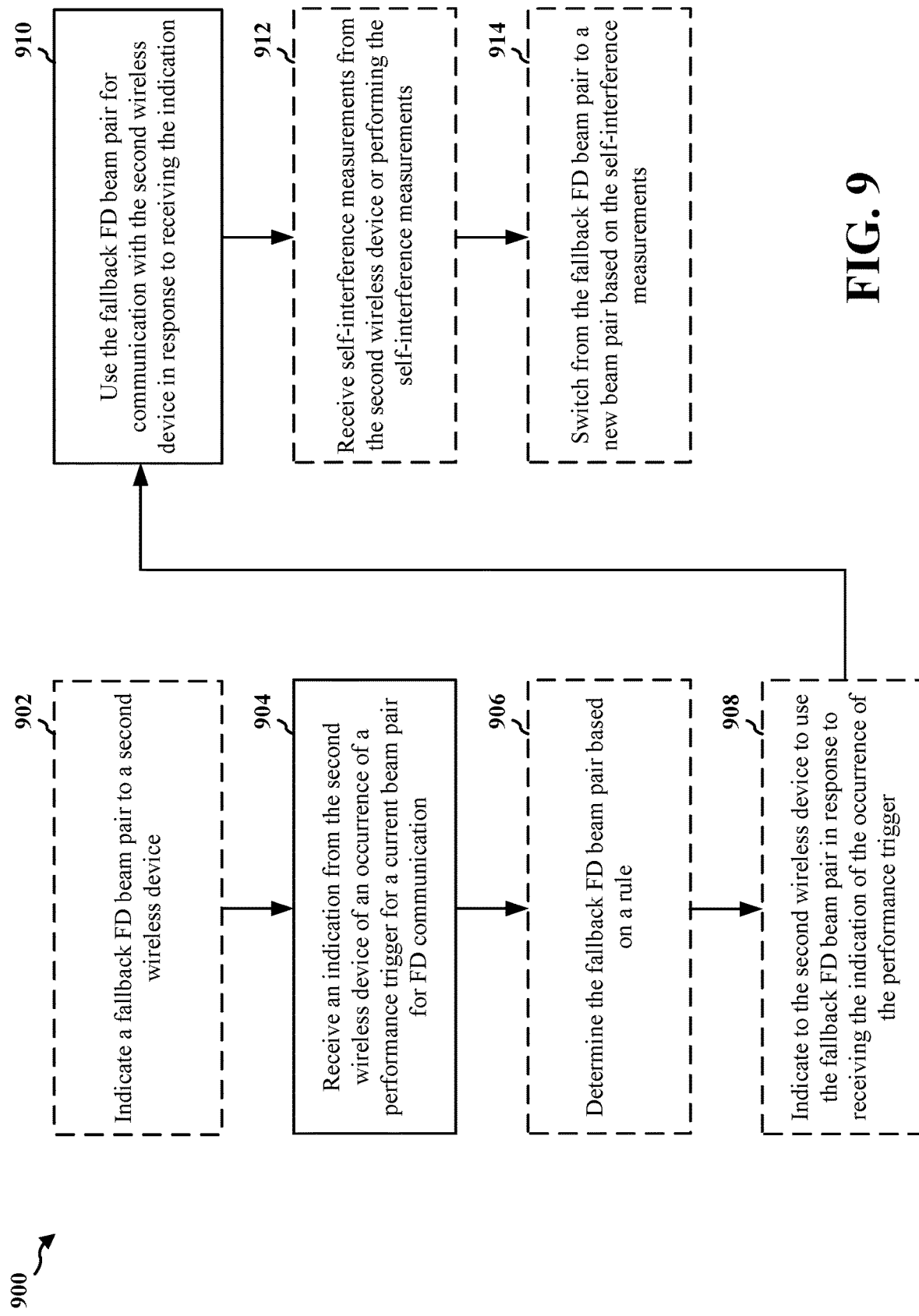
FIG. 9 is a flowchart of a method of wireless communication of a wireless device that receives an indication of a trigger for using a fallback FD beam pair.

FIG. 9 is a flowchart 900 of a method of wireless communication of a wireless device (e.g., a second wireless device 704) that receives an indication of a trigger for using a fallback FD beam pair. The wireless device 702 may be an IAB node (e.g., parent node/donor node) or a base station, which may include the memory 376 and which may be the entire base station or a component of the base station, such as the TX processor 316, the RX processor 370, and/or the controller/processor 375.

At 902, the wireless device may indicate a fallback FD beam pair to a another wireless device (e.g., prior to the wireless device receiving an indication of an occurrence of a performance trigger). For example, referring to FIG. 7, the wireless device 704 may indicate, at 706, the fallback FD beam pair to another wireless device 702. The fallback FD beam pair may be indicated (e.g., at 706) by one or more of an UL beam ID for an UL beam of the fallback FD beam pair, a DL beam ID for a DL beam of the fallback FD beam pair, a beam pair ID for the fallback FD beam pair, or a TCI codepoint that maps to an UL and DL TCI state for the fallback FD beam pair. Further, the indication at 706 may be communicated in one or more of DCI, a MAC-CE, or RRC signaling.

At 904, the wireless device may receive an indication from the other wireless device of an occurrence of a performance trigger for a current beam pair for FD communication. For example, referring to FIG. 7, the wireless device 704 may receive an indication of the performance trigger, at 710, from the other wireless device 702 to use the fallback FD beam pair for FD communication. The performance trigger (e.g., indicated at 710) may include one or more of a beam failure for at least one beam of the current beam pair, a beam performance below a threshold performance level for the current beam pair, a beam quality measurement below a threshold quality level for the at least one beam of the current beam pair, or a self-interference measurement above a threshold interference level for the current beam pair. The performance trigger (e.g., indicated at 710) may be based on a beam quality measurement including at least one of a RSRP for a reference signal, a SINR for the reference signal, or a BLER for the at least one beam of the current beam pair. The reference signal may include at least one or a CSI-RS, a SRS, a PRS, or a SSB.

At 906, the wireless device may determine the fallback FD beam pair based on a rule. For example, referring to FIG. 7, the wireless device 704 may provide the indication, at 706, of the fallback FD beam pair to the other wireless device 702 based on the rule, such as an explicit rule (e.g., a rule that may be defined or transmitted to the other wireless device 702) or an implicit rule (e.g., a rule that may be based on at least one of a subset of reported FD beam pairs received from the other wireless device 702 or the current beam pair used by the wireless device 704 and the other wireless device 702). In an example, the wireless device 704 may be a base station or an IAB node and the other wireless device 702 may be a UE. In another example, the wireless device 704 may be a parent IAB node and the other wireless device 702 may be a child IAB node.

At 908, the wireless device may indicate to the other wireless device to use the fallback FD beam pair in response to receiving the indication of the occurrence of the performance trigger. For example, referring to FIG. 7, the wireless device 704 may indicate, at 712, to the other wireless device 702 to use the fallback FD beam pair. The fallback FD beam pair may be determined based on the current beam pair.

At 910, the wireless device may use the fallback FD beam pair for communication with the other wireless device in response to receiving the indication. For example, referring to FIG. 7, the wireless device 704 may use the fallback FD beam pair at 714b after receiving the indication, at 708, of the occurrence of the trigger. In aspects, the wireless device 704 may use the fallback FD beam pair, at 714b, without continuing to use the current beam pair. In other aspects, the wireless device 704 may continue to use the current beam pair along with using the fallback FD beam pair, at 714b. For example, the wireless device 704 may use the current beam pair and the fallback FD beam pair, at 714b, for duplicate communication. Additionally or alternatively, the wireless device 704 may use a multiplexing scheme for communication on the current beam pair and the fallback FD beam pair.

At 912, the wireless device may receive self-interference measurements from the other wireless device or perform the self-interference measurements. For example, referring to FIG. 7, the wireless device 704 may receive the self-interference measurements at 718 from the other wireless device 702 or perform the self-interference measurements 716b.

At 914, the wireless device may switch from the fallback FD beam pair to a new beam pair based on the self-interference measurements. For example, referring to FIG. 7, the wireless device 704 may switch, at 720b, to a new FD beam pair from the fallback FD beam pair based on the self-interference measurements performed at 716b or the self-interference measurements received, at 718, from other wireless device 702.

Figure 10:
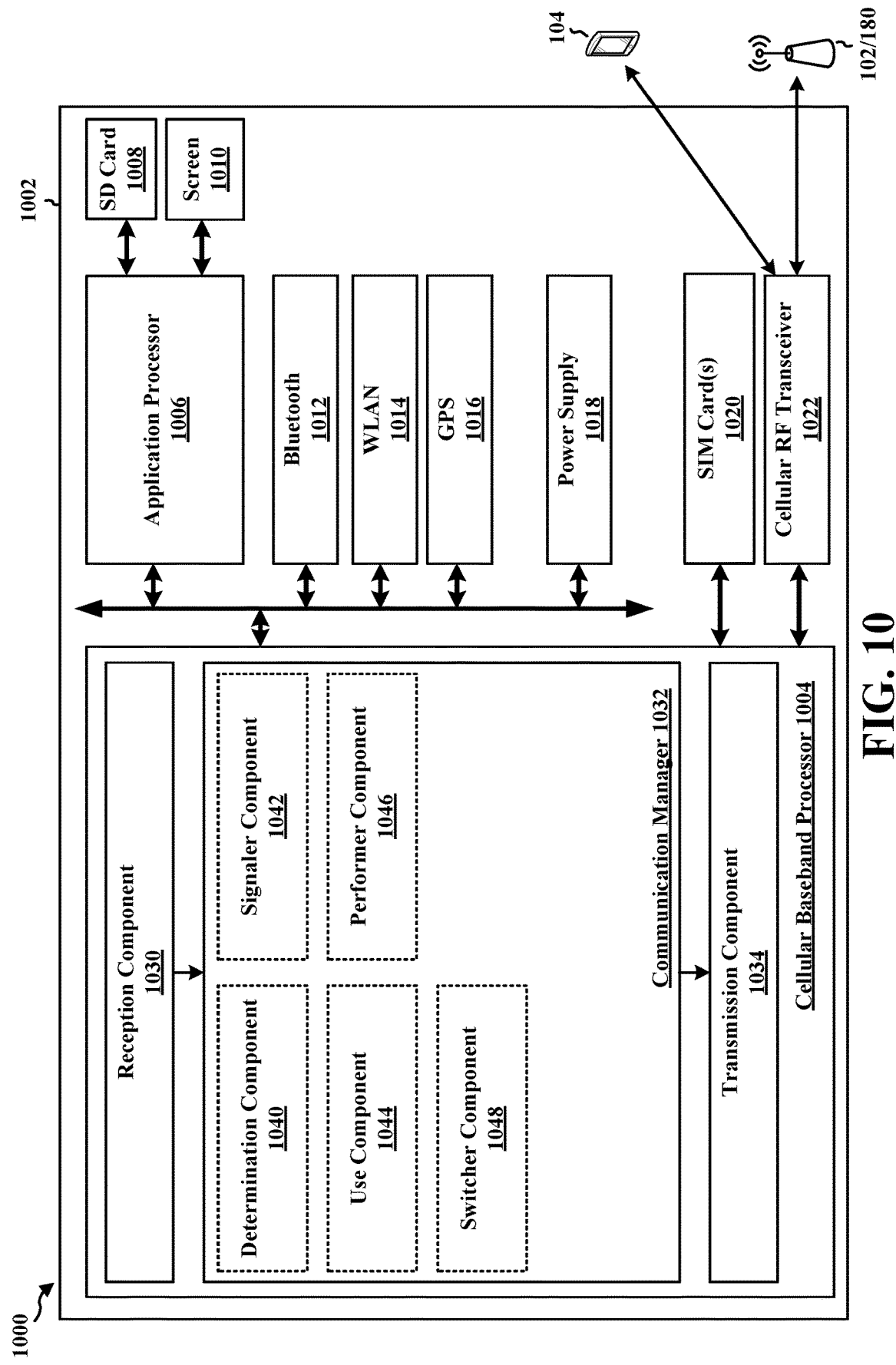
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software.

The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforementioned additional modules of the apparatus 1002.

The communication manager 1032 includes a determination component 1040 that, e.g., as described in connection with 804-806, is configured to determine an occurrence of a performance trigger for a current beam pair for FD communication at a first wireless device, and determine the fallback FD beam pair based on a rule. The communication manager 1032 further includes a signaler component 1042 that, e.g., as described in connection with 808, is configured to signal to the second wireless device that a beam quality measurement is below a threshold quality level. The communication manager 1032 further includes a use component 1044 that, e.g., as described in connection with 812, is configured to use the fallback FD beam pair in response to determining the occurrence of the performance trigger. The communication manager 1032 further includes a performer component 1046 that, e.g., as described in connection with 814, is configured to perform self-interference measurements to determine a new beam pair for FD communication in response to determining the occurrence of the performance trigger. The communication manager 1032 further includes a switcher component 1048 that, e.g., as described in connection with 816, is configured to switch from the fallback FD beam pair to the new beam pair based on the self-interference measurements. As described in connection with 802 and 810, the reception component 1030 may be configured to receive an indication from a second wireless device indicating a fallback FD beam pair, and receive an indication from the second wireless device to use the fallback FD beam pair based at least in part on the indication.

The apparatus may include additional components that perform each of the blocks of the algorithm in the aforementioned flowchart of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving, determining, signaling, using, performing, and switching. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
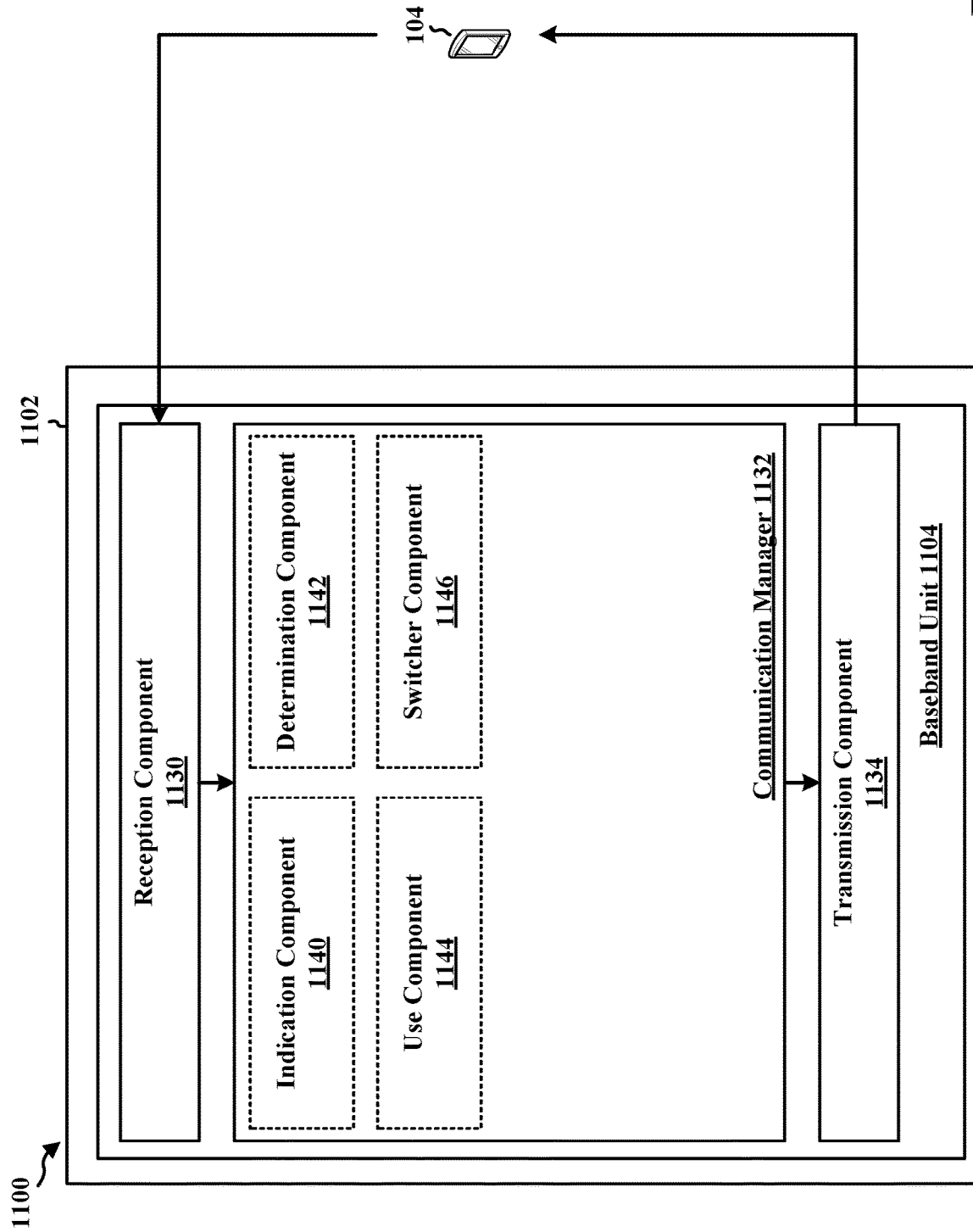
FIG. 11 is a diagram illustrating an example of a hardware implementation for an example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes an indication component 1140 that, e.g., as described in connection with 902 and 908 is configured to indicate a fallback FD beam pair to a second wireless device, and indicate to the second wireless device to use the fallback FD beam pair in response to receiving the indication of the occurrence of the performance trigger. The communication manager 1132 further includes a determination component 1142 that, e.g., as described in connection with 906 is configured to determine the fallback FD beam pair based on a rule. The communication manager 1132 further includes a determination component 1142 that, e.g., as described in connection with 906 is configured to determine the fallback FD beam pair based on a rule. The communication manager 1132 further includes a use component 1144 that, e.g., as described in connection with 910 is configured to use the fallback FD beam pair for communication with the second wireless device in response to receiving the indication. The communication manager 1132 further includes a switcher component 1146 that, e.g., as described in connection with 914 is configured to switch from the fallback FD beam pair to a new beam pair based on the self-interference measurements. As described in connection with 904 and 912, the reception component 1130 may be configured to receive an indication from the second wireless device of an occurrence of a performance trigger for a current beam pair for FD communication, and receive self-interference measurements from the second wireless device.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for indicating, receiving, determining, using, and switching. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, a fallback FD beam pair may be predetermined by the wireless devices as a backup for maintaining FD operations at least during the period of measurement and calibration for the new FD beam pair. The fallback FD beam pair may be determined based on explicit signaling (e.g., using beam IDs or codepoints) or determined based on an implicit rule, such as a rule for mapping current beam IDs to fallback beam IDs. A switch to the fallback FD beam pair may be triggered proactively or reactively. For proactive triggering, the first wireless device may indicate to the second wireless device the beam IDs corresponding to the degraded beams, so that both wireless devices may replace the current FD beam pair with the fallback FD beam pair based on the fallback beam IDs. For reactive triggering, the fallback FD beam pair may be utilized by the wireless devices after an error has occurred (e.g., when no ACK is received in response to a transmission or when a NACK is received). After switching to the fallback FD beam pair, the wireless devices may utilize the fallback FD beam pair alone (e.g., when the fallback FD beam pair is able to maintain the threshold quality level) or in combination with the degraded/current FD beam pair (e.g., based on a multiplexing technique that may duplicate transmissions over the fallback FD beam pair and the current FD beam pair if the fallback FD beam pair is degraded below the threshold quality level).

The following aspects are illustrative only and may be combined with aspects of other embodiments or teachings described herein, without limitation.

Aspect 1 is a method of wireless communication at a first wireless device that includes determining an occurrence of a performance trigger for a current beam pair for full-duplex communication at the first wireless device; and using a fallback full-duplex beam pair in response to determining the occurrence of the performance trigger.

In Aspect 2, the method of Aspect 1 further includes performing self-interference measurements to determine a new beam pair for full-duplex communication in response to determining the occurrence of the performance trigger; and switching from the fallback full-duplex beam pair to the new beam pair based on the self-interference measurements.

In Aspect 3, the method of Aspect 1 or Aspect 2 further includes receiving an indication from a second wireless device indicating the fallback full-duplex beam pair prior to determining the occurrence of the performance trigger.

In Aspect 4, the method of Aspect 3 further includes that the fallback full-duplex beam pair is indicated by one or more of an uplink beam identifier (ID) for an uplink beam of the fallback full-duplex beam pair, a downlink beam ID for a downlink beam of the fallback full-duplex beam pair, a beam pair ID for the fallback full-duplex beam pair, or a transmission configuration indicator (TCI) codepoint that maps to an uplink and downlink TCI state for the fallback full-duplex beam pair.

In Aspect 5, the method of Aspect 3 further includes that the indication is comprised in one or more of downlink control information (DCI), a medium access control-control element (MAC-CE), or radio resource control (RRC) signaling.

In Aspect 6, the method of any of Aspects 1-5 further includes determining the fallback full-duplex beam pair based on a rule.

In Aspect 7, the method of Aspect 6 further includes that the rule is based on at least one of a subset of reported full-duplex beam pairs or the current beam pair.

In Aspect 8, the method of Aspect 6 further includes that the rule is defined or is received from a second wireless device.

In Aspect 9, the method of any of Aspects 1-8 further includes that the performance trigger includes one or more of a beam failure for at least one beam of the current beam pair, beam performance below a threshold performance level for the current beam pair, a beam quality measurement below a threshold quality level for the at least one beam of the current beam pair, or a self-interference measurement above a threshold interference level for the current beam pair.

In Aspect 10, the method of any of Aspects 1-9 further includes that the performance trigger is based on a beam quality measurement including at least one of a reference signal receive power (RSRP) for a reference signal, a signal to noise plus interference ratio (SINR) for the reference signal, or a block error rate (BLER) for the at least one beam of the current beam pair.

In Aspect 11, the method of Aspect 10 further includes that the reference signal includes at least one or a channel state information reference signal (CSI-RS), a sounding reference signal (SRS), a positioning reference signal (PRS), or a synchronization signal block (SSB).

In Aspect 12, the method of Aspect 10 further includes signaling to a second wireless device that the beam quality measurement is below the threshold quality level.

In Aspect 13, the method of Aspect 10 further includes receiving an indication from the second wireless device to use the fallback full-duplex beam pair, wherein the first wireless device uses the fallback full-duplex beam pair based at least in part on the indication.

In Aspect 14, the method of any of Aspects 1-13 further includes determining the fallback full-duplex beam pair based on the current beam pair.

In Aspect 15, the method of any of Aspects 1-14 further includes that the performance trigger is based on a communication error.

In Aspect 16, the method of any of Aspects 1-15 further includes that the occurrence of the communication error is based on reception or transmission of a negative acknowledgement (NACK).

In Aspect 17, the method of any of Aspects 1-16 further includes that the first wireless device uses the fallback full-duplex beam pair for one or more of a physical downlink control channel (PDCCH), a physical downlink shared channel (PDSCH), a physical uplink shared channel (PUSCH), or a physical uplink control channel (PUCCH).

In Aspect 18, the method of any of Aspects 1-17 further includes that the first wireless device uses the fallback full-duplex beam pair without continuing to use the current beam pair.

In Aspect 19, the method of any of Aspects 1-18 further includes that the first wireless device continues to use the current beam pair along with using the fallback full-duplex beam pair.

In Aspect 20, the method of any of Aspects 1-19 further includes that the first wireless device uses the current beam pair and the fallback full-duplex beam pair for duplicate communication.

In Aspect 21, the method of any of Aspects 1-19 further includes that the first wireless device uses a multiplexing scheme for communication on the current beam pair and the fallback full-duplex beam pair.

In Aspect 22, the method of any of Aspects 1-21 further includes that the first wireless device comprises a user equipment (UE) and the second wireless device comprises a base station or an integrated access and backhaul (IAB) node.

In Aspect 23, the method of any of Aspects 1-22 further includes that the first wireless device comprises an integrated access and backhaul (IAB) node, and the second wireless device comprises a parent IAB node.

Aspect 24 is a device including one or more processors and one or more memories in electronic communication with the one or more processors storing instructions executable by the one or more processors to cause a system or an apparatus to implement a method as in any of Aspects 1 to 23.

Aspect 25 is a system or apparatus including means for implementing a method or realizing an apparatus as in any of Aspects 1 to 23.

Aspect 26 is a non-transitory computer-readable medium storing instructions executable by one or more processors to cause the one or more processors to implement a method as in any of Aspects 1 to 23.

Aspect 27 is a method of wireless communication at a first wireless device that includes receiving an indication from a second wireless device of an occurrence of a performance trigger for a current beam pair for full-duplex communication; and using a fallback full-duplex beam pair for communication with the second wireless device in response to receiving the indication.

In Aspect 28, the method of Aspect 27 further includes receiving self-interference measurements from the second wireless device or performing the self-interference measurements; and switching from the fallback full-duplex beam pair to a new beam pair based on the self-interference measurements.

In Aspect 29, the method of Aspect 27 or Aspect 28 further includes indicating the fallback full-duplex beam pair to the second wireless device prior to receiving the indication of the occurrence of the performance trigger.

In Aspect 30, the method of any of Aspects 27-29 further includes that the fallback full-duplex beam pair is indicated by one or more of an uplink beam identifier (ID) for an uplink beam of the fallback full-duplex beam pair, a downlink beam ID for a downlink beam of the fallback full-duplex beam pair, a beam pair ID for the fallback full-duplex beam pair, or a transmission configuration indicator (TCI) codepoint that maps to an uplink and downlink TCI state for the fallback full-duplex beam pair.

In Aspect 31, the method of any of Aspects 27-30 further includes that the indication is indicated in one or more of downlink control information (DCI), a medium access control-control element (MAC-CE), or radio resource control (RRC) signaling.

In Aspect 32, the method of any of Aspects 27-31 further includes determining the fallback full-duplex beam pair based on a rule.

In Aspect 33, the method of Aspect 32 further includes that the rule is based on at least one of a subset of reported full-duplex beam pairs or the current beam pair.

In Aspect 34, the method of Aspect 32 further includes that the rule is defined or is transmitted to the second wireless device.

In Aspect 35, the method of any of Aspects 27-34 further includes that the performance trigger is based on one or more of a beam failure for at least one beam of the current beam pair, beam performance below a threshold performance level for the current beam pair, a beam quality measurement below a threshold quality level for the at least one beam of the current beam pair, or a self-interference measurement above a threshold interference level for the current beam pair.

In Aspect 36, the method of any of Aspects 27-35 further includes that the performance trigger is based on a beam quality measurement including at least one of a reference signal receive power (RSRP) for a reference signal, a signal to noise plus interference ratio (SINR) for the reference signal, or a block error rate (BLER) for the at least one beam of the current beam pair.

In Aspect 37, the method of any of Aspects 27-36 further includes that the reference signal includes at least one or a channel state information reference signal (CSI-RS), a sounding reference signal (SRS), a positioning reference signal (PRS), or a synchronization signal block (SSB).

In Aspect 38, the method of any of Aspects 27-37 further includes that indicating to the second wireless device to use the fallback full-duplex beam pair in response to receiving the indication of the occurrence of the performance trigger.

In Aspect 39, the method of any of Aspects 27-38 further includes that determining the fallback full-duplex beam pair based on the current beam pair.

In Aspect 40, the method of any of Aspects 27-39 further includes that the first wireless device uses the fallback full-duplex beam pair without continuing to use the current beam pair.

In Aspect 41, the method of any of Aspects 27-40 further includes that the first wireless device continues to use the current beam pair along with using the fallback full-duplex beam pair.

In Aspect 42, the method of Aspect 41 further includes that the first wireless device uses the current beam pair and the fallback full-duplex beam pair for duplicate communication.

In Aspect 43, the method of Aspect 41 further includes that the first wireless device uses a multiplexing scheme for communication on the current beam pair and the fallback full-duplex beam pair.

In Aspect 44, the method of any of Aspects 27-43 further includes that the first wireless device comprises a base station or an integrated access and backhaul (IAB) node and the second wireless device comprises a user equipment (UE).

In Aspect 45, the method of any of Aspects 27-44 further includes that the first wireless device comprises a parent integrated access and backhaul (IAB) node, and the second wireless device comprises a child IAB node.

Aspect 46 is a device including one or more processors and one or more memories in electronic communication with the one or more processors storing instructions executable by the one or more processors to cause a system or an apparatus to implement a method as in any of Aspects 27 to 45.

Aspect 47 is a system or apparatus including means for implementing a method or realizing an apparatus as in any of Aspects 27 to 45.

Aspect 48 is a non-transitory computer-readable medium storing instructions executable by one or more processors to cause the one or more processors to implement a method as in any of Aspects 27 to 45.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first wireless device, comprising:
    receiving, from a second wireless device, prior to an occurrence of a performance trigger for a current beam pair, an indication of a fallback full-duplex beam pair;
    determining the occurrence of the performance trigger for the current beam pair;
    switching from the current beam pair to the fallback full-duplex beam pair for full-duplex communication at the first wireless device based at least in part on the occurrence of the performance trigger;
    performing self-interference measurements to determine a new beam pair for full-duplex communication in response to determining the occurrence of the performance trigger; and
    switching from the fallback full-duplex beam pair to the new beam pair based on the self-interference measurements.

2. The method of claim 1, further comprising determining the fallback full-duplex beam pair based on a rule.

3. The method of claim 2, wherein the rule is based on at least one of a subset of reported full-duplex beam pairs or the current beam pair.

4. The method of claim 2, wherein the rule is defined or is received from the second wireless device.

5. The method of claim 4, further comprising signaling to the second wireless device that a beam quality measurement does not exceed a threshold quality level.

6. The method of claim 4, further comprising receiving an indication from the second wireless device to use the fallback full-duplex beam pair, wherein the first wireless device switches from the current beam pair to the fallback full-duplex beam pair based at least in part on the indication.

7. The method of claim 1, further comprising determining the fallback full-duplex beam pair based on the current beam pair.

8. A method of wireless communication at a first wireless device, comprising:
    sending, to a second wireless device, prior to receiving a second indication of an occurrence of a performance trigger for a current beam pair, a first indication of a fallback full-duplex beam pair, wherein the occurrence of the performance trigger triggers a switch from the current beam pair to the fallback full-duplex beam pair;
    receiving, from the second wireless device, the second indication of the occurrence of the performance trigger for the current beam pair;
    switching from the current beam pair to the fallback full-duplex beam pair for full-duplex communication with the second wireless device in response to receiving the second indication;
    receiving self-interference measurements from the second wireless device or performing the self-interference measurements; and
    switching from the fallback full-duplex beam pair to a new beam pair based on the self-interference measurements.

9. The method of claim 8, further comprising sending, to the second wireless device, a third indication to switch from the current beam pair to the fallback full-duplex beam pair in response to receiving the second indication of the occurrence of the performance trigger.

10. The method of claim 8, further comprising determining the fallback full-duplex beam pair based on the current beam pair.

11. An apparatus for wireless communication, the apparatus being a first wireless device comprising:
    a memory; and
    at least one processor coupled to the memory and configured to:
        receive, from a second wireless device, prior to an occurrence of a performance trigger for a current beam pair, an indication of a fallback full-duplex beam pair;
        determine the occurrence of the performance trigger for the current beam pair;
        switch from the current beam pair to the fallback full-duplex beam pair for full-duplex communication at the first wireless device based at least in part on the occurrence of the performance trigger;
        perform self-interference measurements to determine a new beam pair for full-duplex communication in response to determining the occurrence of the performance trigger; and
        switch from the fallback full-duplex beam pair to the new beam pair based on the self-interference measurements.

12. The apparatus of claim 11, wherein the fallback full-duplex beam pair is indicated by one or more of:
    an uplink beam identifier (ID) for an uplink beam of the fallback full-duplex beam pair,
    a downlink beam ID for a downlink beam of the fallback full-duplex beam pair,
    a beam pair ID for the fallback full-duplex beam pair, or
    a transmission configuration indicator (TCI) codepoint that maps to an uplink and downlink TCI state for the fallback full-duplex beam pair.

13. The apparatus of claim 11, wherein the indication is comprised in one or more of:
    downlink control information (DCI),
    a medium access control-control element (MAC-CE), or
    radio resource control (RRC) signaling.

14. The apparatus of claim 13, wherein the first wireless device comprises a user equipment (UE) and the second wireless device comprises a base station or an integrated access and backhaul (IAB) node.

15. The apparatus of claim 13, wherein the first wireless device comprises an integrated access and backhaul (IAB) node, and the second wireless device comprises a parent IAB node.

16. The apparatus of claim 11, wherein the performance trigger includes one or more of:
    a beam failure for at least one beam of the current beam pair, beam performance below a threshold performance level for the current beam pair,
    a beam quality measurement below a threshold quality level for the at least one beam of the current beam pair, or
    a self-interference measurement above a threshold interference level for the current beam pair.

17. The apparatus of claim 11, wherein the performance trigger is based on a beam quality measurement including at least one of a reference signal receive power (RSRP) for a reference signal, a signal to noise plus interference ratio (SINR) for the reference signal, or a block error rate (BLER) for at least one beam of the current beam pair.

18. The apparatus of claim 17, wherein the reference signal includes at least one or more of a channel state information reference signal (CSI-RS), a sounding reference signal (SRS), a positioning reference signal (PRS), or a synchronization signal block (SSB).

19. The apparatus of claim 11, wherein the performance trigger is based on a communication error.

20. The apparatus of claim 19, wherein the occurrence of the communication error is based on reception or transmission of a negative acknowledgement (NACK).

21. The apparatus of claim 11, wherein the first wireless device uses the fallback full-duplex beam pair for one or more of a physical downlink control channel (PDCCH), a physical downlink shared channel (PDSCH), a physical uplink shared channel (PUSCH), or a physical uplink control channel (PUCCH).

22. The apparatus of claim 11, wherein the first wireless device uses the fallback full-duplex beam pair without continuing to use the current beam pair.

23. The apparatus of claim 11, wherein the first wireless device continues to use the current beam pair along with using the fallback full-duplex beam pair.

24. The apparatus of claim 11, wherein the first wireless device uses the current beam pair and the fallback full-duplex beam pair for duplicate communication.

25. The apparatus of claim 11, wherein the first wireless device uses a multiplexing scheme for communication on the current beam pair and the fallback full-duplex beam pair.

26. An apparatus for wireless communication at a first wireless device, the apparatus comprising:
a memory; and
at least one processor coupled to the memory and configured to:
send, to a second wireless device, prior to receiving a second indication of an occurrence of a performance trigger for a current beam pair, a first indication of a fallback full-duplex beam pair, wherein the occurrence of the performance trigger triggers a switch from the current beam pair to the fallback full-duplex beam pair;
receive, from the second wireless device, the second indication of the occurrence of the performance trigger for the current beam pair;
switch from the current beam pair to the fallback full-duplex beam pair for full-duplex communication with the second wireless device in response to receiving the second indication;
receive self-interference measurements from the second wireless device or perform the self-interference measurements; and
switch from the fallback full-duplex beam pair to a new beam pair based on the self-interference measurements.

* * * * *